United States Patent [19]

Bowen et al.

[11] 3,808,838
[45] May 7, 1974

[54] JOINT STRUCTURES IN OR FOR ROTARY SHAFTS

[75] Inventors: Edward Valentine Bowen, Birmingham; Derek Simkins, Burton-on-Trent, both of England

[73] Assignee: GKN Transmissions Limited, Erdington, Birmingham, England

[22] Filed: July 28, 1972

[21] Appl. No.: 276,223

[30] Foreign Application Priority Data
July 30, 1971 Great Britain............... 35852/71

[52] U.S. Cl. ............... 64/27 NM, 64/1 V, 64/11, 74/492
[51] Int. Cl. ............................. F16d 3/14
[58] Field of Search .... 64/27 NM, 27 R, 1 V, 11 R; 287/85 R; 74/492, 493

[56] References Cited
UNITED STATES PATENTS
| | | | |
|---|---|---|---|
| 3,373,630 | 3/1968 | Heurtebise | 74/492 |
| 3,400,558 | 4/1968 | Haines | 64/27 NM |
| 3,714,841 | 2/1973 | Grosseau | 74/492 |
| 3,066,503 | 12/1962 | Fleming et al. | 64/27 NM |

FOREIGN PATENTS OR APPLICATIONS
1,126,071   9/1968   Great Britain................. 74/492

*Primary Examiner*—Samuel Scott
*Assistant Examiner*—Randall Heald
*Attorney, Agent, or Firm*—Marvin Feldman; J. B. Felshin

[57] ABSTRACT

A rotary torque-transmitting shaft having a joint structure which includes a tubular outer component, an inner component disposed within the outer component, and an intermediate component of resilient material disposed in an interspace between the inner and outer components. The intermediate component is slidable axially relative to one of the other components and is in torque-transmitting relation to both of them. The inner and outer components are both of rectangular shape in cross-section so that relative angular movement is limited to a predetermined range even in the event of failure of the intermediate component. The joint structure may be used in a steering column shaft of a motor road vehicle.

5 Claims, 3 Drawing Figures

JOINT STRUCTURES IN OR FOR ROTARY SHAFTS

BACKGROUND OF THE INVENTION

This invention relates to a joint structure in or for a rotary shaft for transmitting torque.

The invention has been developed primarily for application to the shaft of a motor road vehicle connected between a steering wheel and s steering gear box. Such shaft constitutes or forms part of, a structure commonly referred to as the steering column of the vehicle.

In some designs of steering gear incorporated in motor road vehicles, linkage means connecting a movable output element of a steering gear box to the steerable wheels of the vehicle, transmits to the steering gear box some component of vertical movement of the steerable wheels relative to the frame or body structure of the vehicle. Such movement of the steerable wheels is, of course, permitted by the suspension structure of the vehicle which normally serves to connect such wheels to the frame or body. In such designs the steering gear box is so mounted in the frame or body structure of the vehicle as to have some freedom of movement relative thereto.

In such a case the shaft which constitutes or forms part of the steering column may be required to accommodate movement of the steering gear box in a direction axially of the shaft relatively to the steering wheel, the latter remaining in a fixed axial position relative to the frame or body of the vehicle.

Further, whether or not the shaft which constitutes or forms part of the steering column is required to accommodate such axial movement, there is a problem of how to reduce the transmission of torsional vibration resulting from travel of the vehicle over rough road surfaces to the steering wheel without reducing to an unacceptable degree the precision with which the steerable wheels may be set in any given position when the steering wheel is turned to a given position.

Torsional vibrations generated by travel of the vehicle over rough road surfaces have a frequency spectrum around 20 Hz, i.e. the torque load applied to the shaft from the steerable wheels when the latter travel over a rough road surface reverses approximately 40 times per second; whereas the torque load applied to the shaft from the steering wheel when the latter is turned from a straight-ahead position to a position in which the steerable wheels are turned to the right or the left to cause the vehicle to change direction is typically reversed at a much lower frequency believed to be in the region 1 Hz to 2 Hz.

The present invention is based upon appreciation of these factors and has for one of its objects the provision of a joint structure in or for a shaft which constitutes or forms part of the steering column of a motor road vehicle which is better adapted than those heretofore available to meet the particular requirements above referred to.

It is, however, to be understood that the invention is generally applicable to any rotary torque transmitting shaft in which similar or analogous requirements arise, more particularly those where relatively low values of torque are required to be transmitted at relatively low speeds of rotation of the shaft, whilst absorbing higher frequency oscillations transmitted in the reverse direction from the driven member to the driving member connected respectively to opposite ends of the shaft.

SUMMARY OF THE INVENTION

According to the invention we provide in a torque-transmitting shaft an improved joint structure which comprises a tubular outer component, an inner component disposed within the outer component, and an intermediate component disposed in an interspace between the inner component and the outer component. The intermediate component is formed of resilient material, is slidable axially relative to one of the inner and outer components, and is in torque-transmitting relation with both of the inner and outer components.

Preferably the internal cross-sectional shape of the outer component is non-circular, and the external cross-sectional shape of the inner component is also non-circular, the external dimensions of the inner component relative to the internal dimensions of the outer component being such that the inner component can rotate through a limited angle only relative to the outer component, even in the absence of the intermediate component. This provides a safety factor, in that any shaft which incorporates the joint structure will continue to transmit torque even if the intermediate component is subjected to stess conditions which it is unable to bear, for example causing it to flow or to be disrupted.

Under zero torque loading of the joint, the intermediate component may be stress-free, but preferably it is subjected to a degree of precompression such as to eliminate any backlash in the assembly.

DETAILED DESCRIPTION OF THE PREFERRED EMBODIMENT

Figure 1:
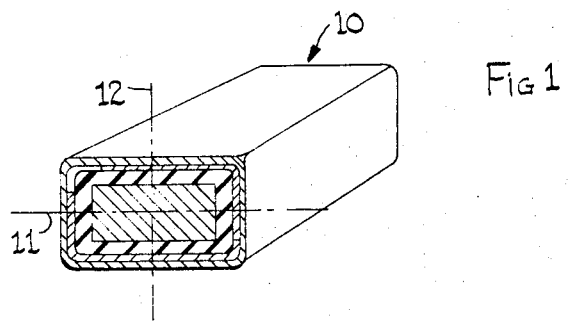
FIG. 1 is a fragmentary perspective view showing part of a rotary torque transmitting shaft incorporating one embodiment of joint structure in accordance with the invention.
Figure 2:
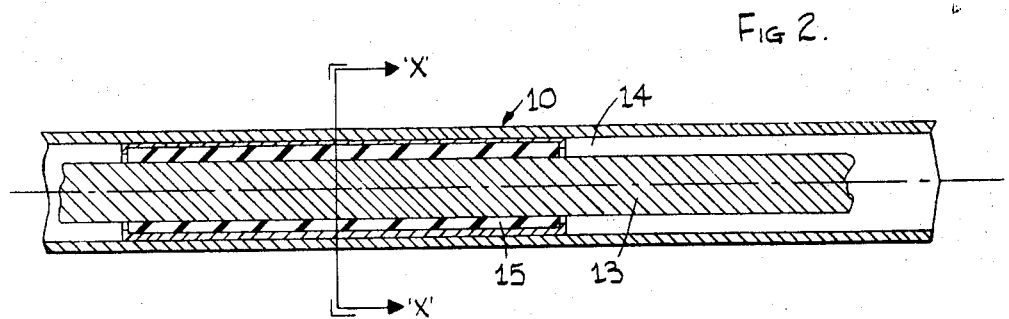
FIG. 2 is a view of the same embodiment in a longitudinal cross-sectional plane passing through the axis of the shaft.

The embodiment of joint structure illustrated is intended to be incorporated in a shaft which transmits rotary movement from the steering wheel of a motor road vehicle to the input element of a steering gear box, the latter being either of the rack and pinion type or, possibly, some other type such as a worm and wormwheel, worm and peg, or cam gear type.

The joint structure comprises a tubular outer component 10 which in transverse cross-section is of rectangular shape both internally and externally and has longer and shorter dimensions along mutually perpendicular axes 11 and 12 which typically are in the ratio 2:1. The outer component may be formed from tubular metal stock, for example mild steel, either seemless or longitudinally welded, but providing a smooth interior surface. It will further be noted that the wall thickness of the tube is small relatively to its cross-sectional dimension and typically would be in the range 0.040 inches to 0.100 inches.

The joint structure further comprises an inner component 13 which is shown as a rod of solid cross-section but could be of tubular form. Its external cross-section is geometrically similar to the internal cross-section of the outer component but smaller in size to provide a "rectangular annular" interspace 14 between the two components.

Within the annular space 14 is disposed an intermediate component in the form of a sleeve 15 of rubber which is secured to the inner component 13.

If the inner component 13 is formed of mild steel a known technique may be used for bonding the rubber sleeve 15 to the external surface of the inner component. Other securement techniques may be employed if desired. For example, the inner component could be formed with keying recesses and/or projections receiving or engaging in the rubber sleeve.

The rubber sleeve 15 has a substantial length relatively to its mean external cross-sectional dimensions, typically being four to five times the length of the smaller of these external cross-sectional dimensions.

Figure 4:
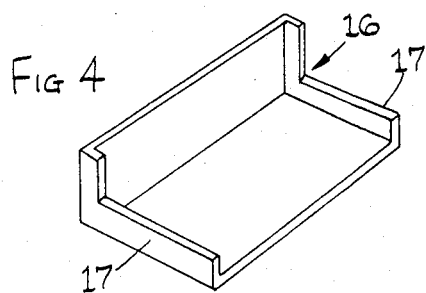
FIG. 4 is a fragmentary perspective view on an enlarged scale showing one of the elements of the liner incorporated in the joint.

The joint structure further comprises a liner imterposed between the sleeve 15 and the outer component 10. The liner is formed conveniently of two elements 16, one of which is shown in FIG. 4 and is of a form to embrace one of the smaller area faces and one of the larger area faces of the sleeve 15 and adjacent portions of the two end faces thereof. The element 16 is thus generally of L-shape in cross-section and is of relatively thin-walled form compared with the wall thickness of the sleeve.

The element 16 is formed of a material which has a low coefficient of friction with respect to the surface presented by the outer component 10. For example, one suitable material is that known by the name "Kematol" which is an acetal resin impregnated with PTFE. Alternatively, the material known as "Delrin" may be employed. Either of these materials are to a degree self-lubricating with respect to metal surfaces such as mild steel.

The end flanges 17 of the elements 16 which engage the end faces of the sleeve ensure that it is held positively against longitudinal displacement relatively to the sleeve 15, but the external surfaces of the liner elements slide over the internal surface of the outer component 10, thereby enabling relative axial or plunging movement between the outer and inner components 10 and 13 to take place.

The flanges 17 have a depth such that a gap exists between their edges and the inner component 13.

Figure 3:
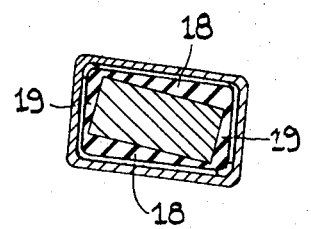
FIG. 3 is a cross-sectional view on the line X—X of FIG. 2 showing the relative positions of the inner and outer components under torque transmitting conditions.

Under conditions of torque transmission certain regions of the sleeve 15 are subjected to compressive stress as between the external and internal faces of the sleeve. Such regions are situated at 18 and 19, as seen in FIG. 3.

It will be noted that the cross-sectional dimensions of the inner and outer components are such that the larger dimension of the internal component in cross-section is greater than the smaller internal dimension of the external component, so that even if there should be structural failure of the material of the intermediate component, rotation of the inner component relatively to the outer component can take place only through a limited angle, for example ±12° with the rubber sleeve 15 completely displaced.

Under conditons of torque which the joint is designed to transmit, for example up to 100 lb. feet, the rubber sleeve 15 will be stressed well within its capabilities without flowing or becoming ruptured.

It will, of course, be understood that modifications may be made.

Thus, for example, the outer component could have a cross-sectional shape which is square, oval or lemon-shaped, the inner component in these cases having a cross-sectional shape which is geometrically similar, or approximately so.

Instead of incorporating the joint as an integral part of the shaft, it may be formed as a unit for connection between two components of the shaft. In this case the outer component 10 would be formed at one end with an attachment portion enabling it to be connected to a shaft, for example with a spigot, socket or flange element. Similarly the inner component would be formed at the opposite end of the joint with a similar attachment portion.

A further modification is that, instead of employing relatively sharp rectangular corners in respect of the intermediate component on either the rubber sleeve 15 or the elements 16 of the liner, rounded corners may be employed and similarly such rounded corners may be incorporated in the inner component, outer component, or both, as desired, in order to minimise regions of high compressive stress in the intermediate component.

Further, instead of securing the rubber sleeve 15 to the inner component 13 by bonding, the latter may be formed with anchorage means. For example, it could incorporate grooves at each end of the sleeve fitted with circlips forming shoulder bearing against the axially presented end faces of the sleeve.

The joint structure may be assembled by fitting the sleeve to the inner component and securing it thereto either by bonding or circlips referred to. Thereafter the inner component with the sleeve is introduced axially into the outer component. For this purpose a convergent tubular or funnel-shaped member may be provided in end-to-end abutting relation with the outer component 10.

The external cross-sectional dimension of the intermediate component, when unstressed, may somewhat exceed the internal cross-sectional dimensions of the outer component 10, so that there is inward radial pre-compression of the intermediate component. This is effected by engagement with the internal surface of the guide funnel during introduction of the intermediate component into the outer component.

When the invention is applied to a steering column shaft, maximum vibration absorption or insulation is achieved in the unladen condition, i.e. no steering lock As the steering wheel is turned, torque in the system increases, the resilient material is compressed locally in the regions indicated near the corners of the inner component, and the level of damping reduces, creating a greater positive "feel" of steering behavior for the driver.

Under high torque conditions, some problem may be met in overcoming "stiction" between the inner and outer components of the assembly when this is required to plunge i.e. afford longitudinal movement relatively between the components 10 and 13.

Such "stiction" results from the fact that when a high torque is applied the stresses in the sleeve 15 produce areas of high contact pressure between the element 16 and the outer component 10 requiring an increased axial load to initiate sliding. As the axial load approaches the required value, some axial deformation of the sleeve tends to take place, which increases the radial stressing in the sleeve and leads to a still higher value of "stiction."

Figure 5:
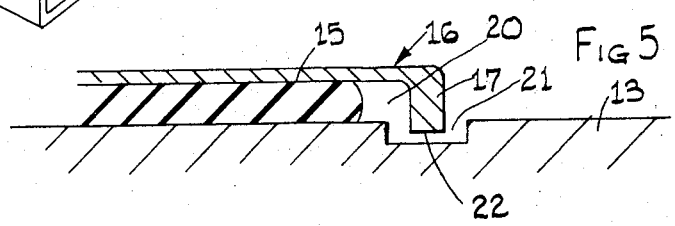
FIG. 5 is a fragmentary sectional view on a further enlarged scale and on the longitudinal cross-sectional plane passing through the axis of the shaft illustrating a modification.

To overcome this problem, a construction as illustrated in FIG. 5 may be adopted.

In this construction, components already described are designated by like numerals of reference, and the preceding description is to be deemed to apply subject to the following modifications.

In this construction, the sleeve 15 and the flanges 17 of the components 16 are spaced from each other at both ends of the component 16 by a gap 20, and the flanges are adapted to couple the liner with the inner component 13 to limit axial movement of the liner relative to the inner component.

Further, the inner component 13 is formed with a groove 21 into which the flange 17 projects, maintaining, however, a clearance space 22 between the inner edge of the flange 17 and the bottom of the groove. The axial dimension of the groove is appreciably greater than the axial dimension of the flange, for example, of the order of 3 times its dimension. It will be noted, however, that the axial clearance between the flange and the lateral boundaries of the groove 22 are less than the axial dimension of the gap 20.

Under the conditions described above, the flange 17 is contacted by one or other of the axial boundaries of the groove 22 before deformation of the rubber sleeve 15 occurs due to closure of the gap 20. Accordingly, increase in radial load arising from this cause is avoided by positive contact between the flange 17 and one or the other axial boundary of the groove 22 serving to initiate sliding of the component 16 with respect to the outer component 10.

We claim:

1. In a rotary torque-transmitting shaft, the improved joint structure comprising:
   a. a tubular outer component having a longitudinal axis,
   b. an inner component disposed within the outer component, the external cross-sectional dimensions of the inner component being such relative to the internal cross-sectional dimensions of the outer component that an interspace is defined between the inner and outer components,
   c. an intermediate component in said clearance space, being formed of resilient material, being slidable axially relative to one of said inner and outer components, and being in torque-transmitting relation to both of said inner and outer components,
   d. a friction-reducing liner interposed between said intermediate component and one of the inner and outer components, and
   e. means on the liner for co-operating with the other of the inner and outer components to restrict axial displacement of the liner relative to said other component, whereby said axial deformation of the intermediate components is restricted in use,
   wherein the internal cross-sectional shape of the outer component is non-circular, the external cross-sectional shape of the inner component is non-circular, and the relative dimensions of these components are such that in the absence of the intermediate component, rotation of the inner component relative to the outer component about said axis is limited, wherein the internal cross-sectional dimensions of the outer component along mutually-perpendicular axes which are both perpendicular to said longitudinal axis are unequal, and wherein the maximum external cross-sectional dimension of the inner component is greater than the minimum internal cross-sectional dimension of the outer component.

2. In a rotary torque-transmitting shaft, the improved joint structure comprising:
   a. a tubular outer component having a longitudinal axis,
   b. an inner component disposed within the outer component, the external cross-sectional dimensions of the inner component being such relative to the internal cross-sectional dimensions of the outer component that an interspace is defined between the inner and outer components,
   c. an intermediate component in said clearance space, being formed of resilient material, being slidable axially relative to one of said inner and outer components, and being in torque-transmitting relation to both of said inner and outer components,
   d. a friction-reducing liner interposed between said intermediate component and one of the inner and outer components, and
   e. means on the liner for co-operating with the other of the inner and outer components to restrict axial displacement of the liner relative to said other component, whereby said axial deformation of the intermediate component is restricted in use,
   wherein said liner includes flanges which overlap with end faces of said intermediate component, whereby axial displacement of the liner relative to the intermediate component is restrained.

3. In a rotary torque-transmitting shaft, the improved joint structure comprising:
   a. a tubular outer component having a longitudinal axis,
   b. an inner component disposed within the outer component, the external cross-sectional dimensions of the outer component that an interspace is defined between the inner and outer components,
   c. an intermediate component in said clearance space, being formed of resilient material, being slidable axially relative to one of said inner and outer components, and being in torque-transmitting relation to both of said inner and outer components,
   d. a friction-reducing liner interposed between said intermediate component and one of the inner and outer components, and
   e. means on the liner for co-operating with the other of the inner and outer components to restrict axial displacement of the liner relative to said other component, whereby said axial deformation of the intermediate component is restricted in use, wherein the external cross-sectional dimensions of said intermediate component, when in an unstressed condition, exceed the internal cross-sectional dimensions of said outer component, whereby the intermediate component is stressed in compression when assembled with the outer component, wherein the liner is generally of rectangular shape in transverse cross-section and comprises two elements, each being L-shaped in transverse cross-section.

4. In a rotary torque-transmitting shaft, the improved joint structure comprising:

a. a tubular outer component having a longitudinal axis, b. an inner component disposed within the outer component, the external cross-sectional dimensions of the inner component being such relative to the internal cross-sectional dimensions of the outer component that an interspace is defined between the inner and outer components, c. an intermediate component in said clearance space, being formed of resilient material, being slidable axially relative to one of said torque-transmitting relation to both of said inner and outer components, d. a friction-reducing liner interposed between said intermediate component and one of the inner and outer components, and e. means on the liner for co-operating with the other of the inner and outer components to restrict axial displacement of the liner relative to said other component, whereby said axial deformation of the intermediate component is restricted in use, wherein the liner is interposed between the tubular outer member and the intermediate component, the inner component is formed adjacent to opposite ends of the liner with recesses, and said co-operating means on the liner is in the form of projections which are received in respective ones of the recesses.

5. The improvement according to claim 4 wherein said projections are in the form of flanges which overlap with end faces of said intermediate component, whereby the flanges co-operate with both the intermediate component and the inner component to restrain axial movement of both of these components relative to the liner.

* * * * *